United States Patent
Wang et al.

(10) Patent No.: US 9,784,567 B2
(45) Date of Patent: Oct. 10, 2017

(54) DISTRIBUTED BRILLOUIN SENSING USING CORRELATION

(71) Applicant: NEC Laboratories America, Inc., Princeton, NJ (US)

(72) Inventors: Ting Wang, West Windsor, NJ (US); Yi Weng, Lafayette, LA (US)

(73) Assignee: NEC Corporation, Tokyo (JP)

(*) Notice: Subject to any disclaimer, the term of this patent is extended or adjusted under 35 U.S.C. 154(b) by 190 days.

(21) Appl. No.: 14/842,542

(22) Filed: Sep. 1, 2015

(65) Prior Publication Data
US 2016/0109223 A1 Apr. 21, 2016

Related U.S. Application Data

(60) Provisional application No. 62/064,534, filed on Oct. 16, 2014.

(51) Int. Cl.
*G01K 11/32* (2006.01)
*G01B 11/16* (2006.01)

(52) U.S. Cl.
CPC ............ *G01B 11/168* (2013.01); *G01K 11/32* (2013.01); *G01K 2011/322* (2013.01)

(58) Field of Classification Search
CPC ............................................ G01K 2011/322
See application file for complete search history.

(56) References Cited

U.S. PATENT DOCUMENTS

| 7,529,434 B2 | 5/2009 | Taverner et al. |
| 2013/0229649 A1* | 9/2013 | Li ...................... G01M 5/0091 356/73.1 |
| 2014/0042306 A1 | 2/2014 | Hoover et al. |

OTHER PUBLICATIONS

Vengsarkar, Ashish M., et al. "Fiber-optic dual-technique sensor for simultaneous measurement of strain and temperature." Journal of Lightwave Technology 12.1 (1994): 170-177.*
H. H. Kee et al., "All-fiber system for simultaneous interrogation of distributed strain and temperature sensing by spontaneous Brillouin scattering," Optical Letters, May 15, 2000, pp. 695-697, vol. 25, No. 10.
K. Y. Song et al., "Distributed strain measurement with millimeter-order spatial resolution based on Brillouin optical correlation domain analysis," Optical Letters, Sep. 1, 2006, pp. 2526-2528, vol. 31, No. 17.
M. N. Alahbabi et al., "Simultaneous temperature and strain measurement with combined spontaneous Raman and Brillouin scattering," Optical Letters, Jun. 1, 2005, pp. 1276-1278, vol. 30, Issue 11.
W. Zou et al., "Complete discrimination of strain and temperature using Brillouin frequency shift and birefringence in a polarization-maintaining fiber," Optical Express, Feb. 2, 2009, pp. 1248-1255, vol. 17, No. 3.

* cited by examiner

*Primary Examiner* — Shawn Decenzo
(74) *Attorney, Agent, or Firm* — Joseph Kolodka

(57) ABSTRACT

Methods and systems for sensing conditions of a fiber include splitting a light signal into two branches. A first branch is converted to have a mode different from that of the second branch. Both branches are mode multiplexed into a single fiber. An output of the fiber is mode demultiplexed into the two branches. The first branch is mode converted to its original mode. Brillouin scattering patterns of the two branches are compared to determine a temperature and strain profile of the fiber.

12 Claims, 4 Drawing Sheets

DISTRIBUTED BRILLOUIN SENSING USING CORRELATION

RELATED APPLICATION INFORMATION

This application claims priority to provisional application 62/064,534, filed Oct. 16, 2014, the contents thereof being incorporated herein by reference.

BACKGROUND OF THE INVENTION

Sensors based on Brillouin scattering have the ability to measure stress and strain in a medium. This results from an interaction between photons and one or more types of quasiparticles such as phonons in the medium. When the medium is under a strain, whether mechanical, electrical, or thermal in origin, the optical properties of the medium change, causing a certain amount of incident light to be scattered. This relationship, between temperature/strain and the Brillouin frequency shift, is linear and can be exploited for a number of purposes including, e.g., deformation monitoring and health diagnosis of architectural structures. An optical Brillouin scattering sensor embedded within a structure can replace thousands of closely attached and potentially expensive point sensors.

One problem of conventional time-domain Brillouin sensor techniques is their intrinsic limitation of spatial resolution. The Brillouin gain spectrum (BGS) suffers severe broadening and it becomes difficult to resolve the Brillouin frequency shift (BFS) accurately if the optical pulse is shorter than the damping time of an acoustic wave in the medium. This limits the spatial resolution of conventional Brillouin sensors to around one meter and measurement time can be as long as several minutes. Another issue with conventional methods is that the BFS is sensitive to both strain and temperature. Since BFS is linearly proportional to the changes of both variables, it is theoretically impossible to separate them by measuring only one BFS, which results in ambiguity in measurements.

Two general types of Brillouin scattering sensing techniques have been employed, which include spontaneous Brillouin scattering techniques and stimulated Brillouin scattering techniques. The former is used in Brillouin optical time-domain reflectometry (BOTDR) and inherits the limitations in spatial resolution and measurement time inherent to time-domain analysis. The latter includes several techniques, including Brillouin optical time-domain analysis (BOTDA), Brillouin optical frequency-domain analysis (BOFDA), and Brillouin optical correlation-domain analysis (BOCDA). BOTDA is also in the time domain, and while BOFDA improves the signal-to-noise ratio by using synchronous detection, analysis is still performed in the time domain. BOCDA circumvents the resolution limit based on the synthesis of the optical coherence function, which may achieve a high centimeter-order spatial resolution, but needs access to both ends of a fiber under test, which imposes strict limitations in many damage detection systems. For example, if part of the fiber cracks, the measurement can no longer be performed using BOCDA.

Approaches to separating temperature and strain measurements include using a single-mode fiber to measure both the BFS and Brillouin power level, as Brillouin power is also related to strain and temperature. However, the measuring range and resolution of that method are limited by imprecision in Brillouin power measurements. Another single-mode fiber approach uses both Raman and Brillouin signals to separate temperature and strain. However, noise arises from the Raman intensity measurement, and both direct detection and coherent detection that add additional cost and complexity to the sensor.

One final approach is to use multiple single-mode fibers within a single fiber core. However, a large interference between wavelengths leads to poor spatial resolution, limited sensing accuracy, and short sensing distance. Furthermore, the fibers must be maintained at least 40 μm apart to minimize crosstalk, making such an arrangement quite expensive.

BRIEF SUMMARY OF THE INVENTION

A method for sensing conditions of a fiber includes splitting a light signal into two branches. A first branch is converted to have a mode different from that of the second branch. Both branches are mode multiplexed into a single fiber. An output of the fiber is mode demultiplexed into the two branches. The first branch is converted to its original mode. Brillouin scattering patterns of the two branches are compared to determine a temperature and strain profile of the fiber.

A sensor for sensing conditions of a fiber includes a light source. A coupler is configured to split an output of the light source into two branches. A mode converter is configured to convert light in a first branch between a mode shared by the second branch and a different mode. A mode multiplexer is configured to multiplex both branches onto a single fiber. A mode demultiplexer is configured to demultiplex an output of the fiber into the two branches, with light on the first branch being passed to the mode converter for conversion back to the mode shred by the second branch. A processor configured to compare Brillouin scattering patterns of the two branches to determine a temperature and strain profile of the fiber.

DETAILED DESCRIPTION

Embodiments of the present principles coherently receive reflected spontaneous Brillouin scattered light from a fiber using multiple modes, with different modes capturing information about different physical properties of the fiber. Reflected probe light is used to form a Brillouin gain spectrum (BGS) taken on by the received scattered light. The present embodiments furthermore maintain a phase difference between the Stokes light and a reference light to maintain a modulation frequency and modulation index, where the Stokes light is the result of constructive scattering that adds energy ro a photon, thereby providing a positive shift to the photon's wavenumber. The received scattered light is analyzed to find its reflection location and its Brillouin frequency shift (BFS) to determine at last one physical condition of the fiber including, e.g., strain, temperature, pressure, or acceleration as a function of distance at all points along the optical fiber.

One embodiment of the present principles uses an optical few-mode fiber (FMF) which supports the propagation of up to, e.g., twelve spatial and polarization modes by using, for example, the $LP_{01}$, $LP_{11}$, $LP_{21}$, and $LP_{02}$ modes, where each spatial mode has a unique BGS and BFS at least, e.g., 20 MHz apart from any other mode in use. Different physical properties, such as temperature and strain, can be differentiated by solving a simultaneous equation. The sensor may further include a heterodyne receiver that uses two balanced photodiodes that are optically coupled to the FMF and are configured to coherently receive the reflected Brillouin scattered light to determine the local Brillouin frequency.

Compared to conventional sensors, the present embodiments have superior spatial resolution because the correlation between frequency-modulated light waves is controlled to give high heterodyne output. As Brillouin scattering allows measurement of a distribution of a physical change at all points along the fiber under test, through light injection from only one end of the fiber, the present embodiments have broad applicability. Using, e.g., six different spatial modes is analogous to having three independent single-mode fibers measuring temperature and three fibers measuring strain, which significantly improves measurement resolution. Furthermore, because all of the modes are within a single guiding medium, the present embodiments are cost efficient compared to multi-fiber systems. Spare modes can be used to measure other physical changes such as pressure, displacement, or acceleration.

Figure 1:
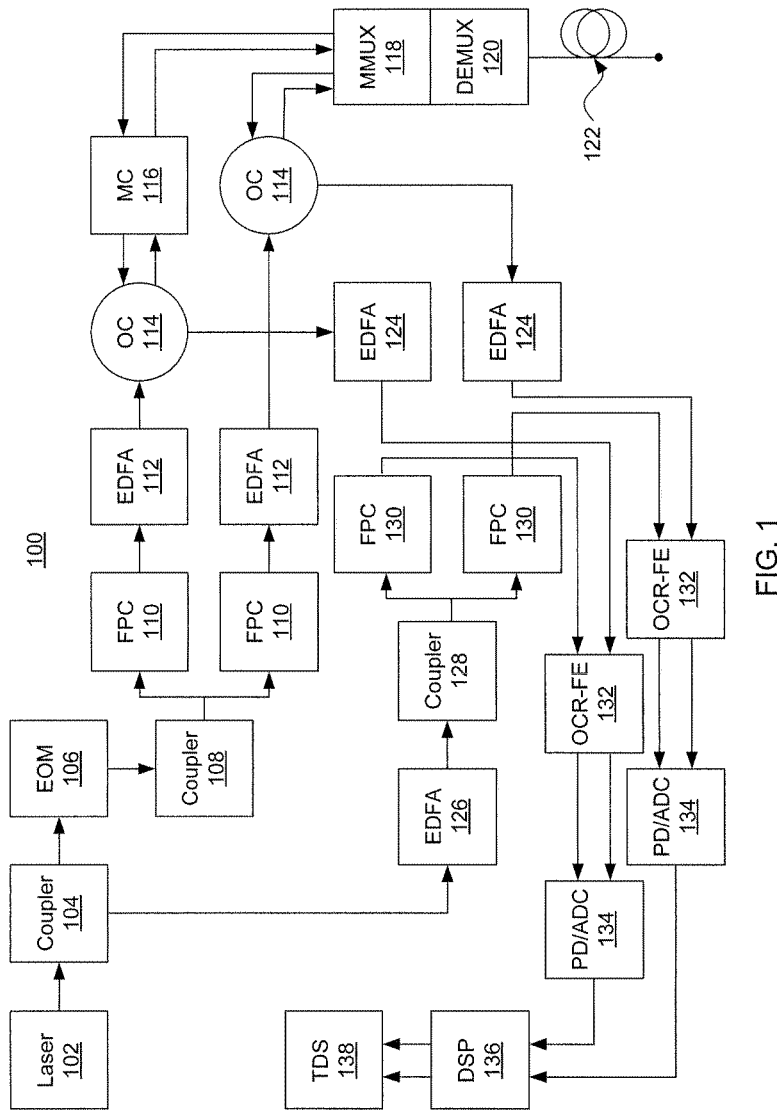
FIG. 1 is a block diagram of a system for sensing temperature and strain in a fiber with Brillouin scattering in accordance with the present principles.

Referring now to FIG. 1, a Brillouin sensor 100 is shown. It should be recognized that this sensor 100 is configured to measure one physical condition. However, by generating additional pump beams at different modes and corresponding local oscillator beams, any number of physical conditions may be measured. A laser 102 emits a laser and acts as a light source for the sensor 100. It is specifically contemplated that the laser 102 may be a 1550 nm distributed feedback laser diode, but it should be understood that any appropriate laser operating at any suitable frequency may be used. In particular, it is contemplated that laser 102 will generate a continuous wave or pulsed output with a wavelength range of between about 600 nm and about 1600 nm. The laser beam output is divided into two arms by a 50:50 coupler 104, where one arm is used to generate the probe beam and the other arm is used as a local oscillator.

Along the probe arm, an electro-optical modulator 106 is driven with, e.g., a 10 ns Gaussian pulse to provide high pump power for the probe beam, and the output of the electro-optical modulator 106 is further split in a 1×2 coupler 108 to provide pump power for two different spatial modes. A respective fiber polarization controller 110 ensures that the branches output by the coupler 108 are at orthogonal polarizations. The orthogonally polarized beams are then amplified by a respective erbium doped fiber amplifier (EDFA) 112 to control the pump power.

Optical circulators 114 pass the pump beams to the fiber under test 112, with one (or both) of the pump beams passing through a mode converter 116 that may include, e.g., phase plates to launch the pump beams at any appropriate mode. The two different spatial modes are mode multiplexed in multiplexer 118 and launched along the fiber under test 122. The fiber under test 122 is, for example, a four kilometer long FMF with a reflective end. For longer distances, it may be difficult to control the state of polarization of the beams, at which point a polarization maintaining FMF may be needed. It is specifically contemplated that the fiber under test 122 may include a cladding diameter of at least about 125 μm, a coating diameter of at least about 240 μm, and an effective area between about 200 μm² and about 320 μm². The fiber under test 122 may have a loss coefficient α of less than about 0.20 db/km and, in preferred embodiments, of less than about 0.16 dB/km.

Probe signals pass through the fiber 122 and are reflected, either by the reflective end or earlier due to Brillouin scattering. The back-propagating light is mode-demultiplexed by demultiplexer 120 and converted to their original spatial modes by mode converter(s) 116. The optical couplers then take the reflected signals along a different path, where they are amplified by EDFAs 124 to meet the local oscillator path.

The local oscillator path starts at coupler 104 and is amplified by an EDFA 126. The local oscillator beam is then divided by a 1×2 coupler 128 and co-polarized with the pump path by fiber polarization controllers 130. In this manner, the polarization and power of the local oscillator beams are made to match the state of the pump beams before the pump beams pass through the fiber under test 122. Each reflected pump beam is received alongside a respective local oscillator beam at an optical coherent receiver front end 132. The coherent receivers 132 include an optical hybrid coupler and real-time oscilloscope, followed by low-pass filtering, photodetectors and analog-to-digital converters 134. Digital signal processing 136 processes the output of the two received signals, after which point the signals are sampled by a time-domain sampling scope 138.

The effective BGS is determined by a two-dimensional convolution of the intrinsic Brillouin gain and the beat power spectrum:

$$BGS(z_m, f) = \int_{FMF} dz \int_{-\infty}^{+\infty} df\, g_B(z, \Delta f) S_b(\Delta z, f)$$

where $g_B(z, \Delta f)$ is the intrinsic Brillouin gain as a function of distance along the fiber and a change in frequency and $S_b(\Delta z, f)$ is the beat power spectrum as a function of a change in the distance and the frequency, while $z_m$ is the measuring position.

The measured physical condition of the fiber 122 may include at least one of strain, temperature, pressure, and displacement/acceleration as a function of distance at all points of the fiber under test 122. For a linear system, the relation between the strain ε and the acceleration a is $$\varepsilon = \left(\frac{M}{EA}\right) a,$$

where M is the mass, E is the elastic modulus of the material, and A is the cross sectional area.

The present embodiments emit a frequency modulated laser pulse. The synchronously modulated pump and reflected light waves generate beat power spectra and then intensify the acoustic phonons of the fiber under test 122 due to the electrostriction effect by interacting with probe amplification from the pump light. The beat spectra have a delta shaped distribution along the fiber due to the synthesis of the optical coherence function.

The spatial resolution Δz and the measurement range $d_m$ are given by:

$$\Delta z = \frac{v_g \Delta v_B}{2\pi f_m \Delta f}$$

-continued $$d_m = \frac{v_g}{2f_m}$$

where $v_g$ is the light group velocity in the fiber under test 122, $\Delta v_B$ is the BFS, $f_m$ is a sinusoidal modulation frequency, and $\Delta f$ is the sinusoidal modulation amplitude. The pump light is emitted with a waveform of $f_0 + \Delta f \sin(2\pi f_m t)$, while the reflected light has a waveform of $f_0 - f_B + \Delta f \sin(2\pi f_m t)$, where $f_0$ is the base frequency of the laser 102 and $f_B$ is the frequency difference between the pump and reflected light waves, which is approximately equal to the BFS. In the ideal case, the BFS will be exactly equal to $f_B$, but the performance of the local oscillator signal and the photodetector(s) can cause a mismatch between the two.

In coherent detection, a strong narrow-linewidth reference oscillator as part of the pump lightwave is employed, which allows electrical selection of the Brillouin component as well as a large dynamic range. The frequency shift between the reference oscillator and the sensing pulses can be employed to bring the signal-reference beat frequency within the bandwidth of a conventional photodetector.

The present embodiments use heterodyne selection to resolve the position of a physical condition and also to enhance the beat signal. When the pump light is at a first reflected position and $\phi = \psi + 2\pi n$, where $\phi$ and $\psi$ are phase factors and n is an integer, the frequency difference between the reference light and the reflected light are always the same regardless of time, so the beat signal can be detected. In contrast, when pump light is reflected at a position where $\phi \neq \psi + 2\pi n$, the frequency difference between the two light beams changes with time, so the beat signal cannot be observed. Therefore, the distributed measurement becomes feasibly when the position of the correlation peaks is scanned along the FMF by sweeping $f_m$.

Figure 2:
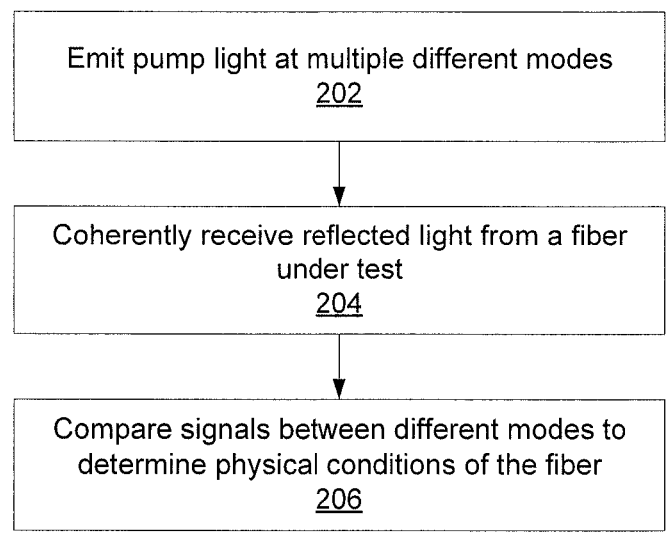
FIG. 2 is a block/flow diagram of a method for sensing temperature and strain in a fiber with Brillouin scattering in accordance with the present principles.

Referring now to FIG. 2, a method of sensing that employs Brillouin scattering is shown. Block 202 emits a pump light at multiple different modes using, e.g., laser 102 and mode converter 116 to generate a set of beams having spatially orthogonal signals. These beams are launched into the fiber under test 122, where they experience Brillouin scattering as a result of physical conditions in the fiber 122. Block 204 coherently receives the reflected light from the fiber under test, comparing the reflected light to a reference oscillator based on the original laser beam. Block 206 then compares the signals received from multiple different modes, allowing for the calculation of multiple physical conditions in the fiber under test 122 that would otherwise be mixed in the result of a single mode.

The operation of block 206 is divided into two main parts: processing the received signals into BFS and analyzing the BFS to determine temperature or strain changes. Because Brillouin backscattered signals are very weak compared with the input light, the randomness of the scattering tends to be averaged out by a large number of scattering events, so that the final path of the radiation appears to be a deterministic distribution of intensity. A total number of data sets (e.g., 20 data sets) are computed to obtain the signal sequence and to rotate the raw incoming signals in complex space. The power spectral density can be estimated using a periodogram method. Block 206 averages the squared magnitude of a fast Fourier transform over windowed sections of the input, which then normalizes the spectral average by the square of the window samples' sum. After doing in-phase/quadrature signal de-rotation and delay shift correction, the received signals are corrected for delay by shifting the signal in time. The signals are then resampled to a synchronous rate.

The signal is plotted without any phase de-rotation to find the BFS through a large amount of averaging. After obtaining BFSes for two different spatial modes, the temperature and strain variations on the fiber 122 can be computed using the two following formulas, where the four proportionality coefficients are related to both the optical and acoustic refractive index in fiber cores as well as dopant concentration:

$$\Delta T = \frac{C_{v\varepsilon}^{Mode 2} \cdot \Delta v_B^{Mode1} - C_{v\varepsilon}^{Mode 1} \cdot \Delta v_B^{Mode 2}}{C_{v\varepsilon}^{Mode 2} \cdot C_{vT}^{Mode1} - C_{v\varepsilon}^{Mode 1} \cdot C_{vT}^{Mode 2}}.$$

$$\Delta \varepsilon = \frac{C_{vT}^{Mode 2} \cdot \Delta v_B^{Mode1} - C_{vT}^{Mode 1} \cdot \Delta v_B^{Mode 2}}{C_{vT}^{Mode 2} \cdot C_{v\varepsilon}^{Mode1} - C_{vT}^{Mode 1} \cdot C_{v\varepsilon}^{Mode 2}}.$$

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 3:
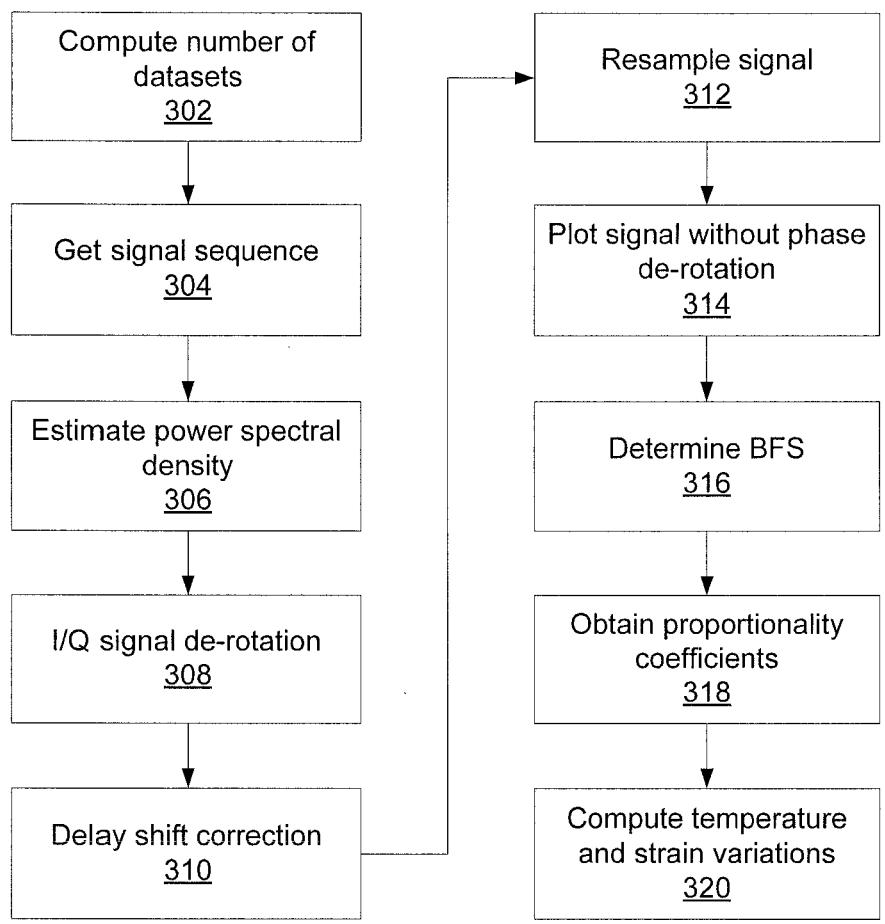
FIG. 3 is a block/flow diagram of a method for calculating a temperature and strain profile in a fiber with Brillouin scattering in accordance with the present principles.

Referring now to FIG. 3, a method for determining temperature and strain variations is shown. Block 302 computes a number of datasets from the received Brillouin signals, receiving the data as a text file and reading the data into an array. Block 304 gets a signal sequence from the datasets by rounding elements of a symbolic matrix toward the nearest integers. All datasets are treated independently and follow the same rules. Block 306 determines the power spectral density of the signal using, e.g, a periodogram method. The signal is I/Q de-rotated in block 308 to correct for a frequency offset by the initial coarse estimation and fine tracking. I/Q derotation may be accomplished based on loop filtering, which estimates the relative phase offset from each symbol. A delay shift correction is applied in block 310. Block 312 resamples the signals to a synchronous rate.

Block 314 plots the signal without any phase de-rotation, while block 316 determines the BFS through averaging. Block 318 obtains proportionality coefficients for the temperature and strain formulas, while block 320 performs the calculations to determine the temperature and strain profiles of the fiber 122.

Figure 4:
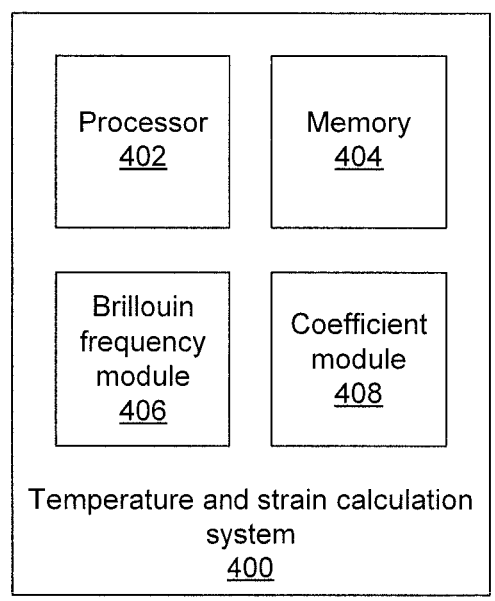
FIG. 4 is a block diagram of a system for calculating a temperature and strain profile in a fiber with Brillouin scattering in accordance with the present principles.

Referring now to FIG. 4, a system 400 for determining a temperature and strain profile of a fiber are shown. The system 400 includes a hardware processor 402 and a memory 404. The system includes a Brillouin frequency module 406 that is configured to determine a Brillouin frequency shift from both signals while a coefficient module 408 determines the proportionality constants. The processor 402 determines a temperature and strain profile for the fiber based on the BFS and the proportionality constants as described above.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for sensing conditions of a fiber, comprising:
splitting a light signal into two branches;
converting a first branch to have a mode different from that of the second branch;
mode multiplexing both branches into a single fiber;
mode demultiplexing an output of the fiber into the two branches;
mode converting the first branch to the original mode of the first branch;
comparing Brillouin scattering patterns of the two branches to determine a temperature and strain profile of the fiber.

2. The method of claim 1, further comprising polarizing each of the two branches to have orthogonal polarizations.

3. The method of claim 1, further comprising coherently detecting the output of the fiber in the two branches.

4. The method of claim 1, wherein comparing the Brillouin scattering patterns comprises determining a Brillouin frequency shift of each branch.

5. The method of claim 4, wherein determining the temperature and strain profiles $\Delta T$ and $\Delta \epsilon$ of the fiber comprises solving:

$$\Delta T = \frac{C_{v\epsilon}^{Mode2} \cdot \Delta v_B^{Mode1} - C_{v\epsilon}^{Mode1} \cdot \Delta v_B^{Mode2}}{C_{v\epsilon}^{Mode2} \cdot C_{vT}^{Mode1} - C_{v\epsilon}^{Mode1} \cdot C_{vT}^{Mode2}}.$$

$$\Delta \epsilon = \frac{C_{vT}^{Mode2} \cdot \Delta v_B^{Mode1} - C_{vT}^{Mode1} \cdot \Delta v_B^{Mode2}}{C_{vT}^{Mode2} \cdot C_{v\epsilon}^{Mode1} - C_{vT}^{Mode1} \cdot C_{v\epsilon}^{Mode2}}.$$

where $\Delta v_B^{Mode1}$ is the Brillouin frequency shift of the signal on the first branch, $\Delta v^{Mode2}_B$ is the Brillouin frequency shift of the signal on the second branch, and $C_{v\epsilon}^{Mode1}$, $C_{v\epsilon}^{Mode2}$, $C_{vT}^{Mode1}$, and $C_{vT}^{Mode2}$ are proportionality constants related to an optical and acoustic refractive index and dopant concentration of the fiber.

6. The method of claim 1, wherein the fiber is a few-mode fiber.

7. A sensor for sensing conditions of a fiber, comprising:
a light source;
a coupler configured to split an output of the light source into two branches;
a mode converter configured to convert light in a first branch between a mode shared by the second branch to a different mode;
a mode multiplexer configured to multiplex both branches onto a single fiber;
a mode demultiplexer configured to demultiplex an output of the fiber into the two branches, with light on the first branch being passed to the mode converter for conversion back to the mode shared by the second branch;
a processor configured to compare Brillouin scattering patterns of the two branches to determine a temperature and strain profile of the fiber.

8. The sensor of claim 7, further comprising a polarization controller on each branch to polarize each of the two branches to have orthogonal polarizations.

9. The sensor of claim 7, further comprising coherently receivers configured to detect the output of the fiber in the two branches.

10. The sensor of claim 7, wherein the processor is further configured to determine a Brillouin frequency shift of each branch.

11. The sensor of claim 10, wherein the processor is further configured to determine the temperature and strain profiles $\Delta T$ and $\Delta \epsilon$ of the fiber by solving:

$$\Delta T = \frac{C_{v\epsilon}^{Mode2} \cdot \Delta v_B^{Mode1} - C_{v\epsilon}^{Mode1} \cdot \Delta v_B^{Mode2}}{C_{v\epsilon}^{Mode2} \cdot C_{vT}^{Mode1} - C_{v\epsilon}^{Mode1} \cdot C_{vT}^{Mode2}}.$$

$$\Delta \epsilon = \frac{C_{vT}^{Mode2} \cdot \Delta v_B^{Mode1} - C_{vT}^{Mode1} \cdot \Delta v_B^{Mode2}}{C_{vT}^{Mode2} \cdot C_{v\epsilon}^{Mode1} - C_{vT}^{Mode1} \cdot C_{v\epsilon}^{Mode2}}.$$

where $\Delta v_B^{Mode1}$ is the Brillouin frequency shift of the signal on the first branch, $\Delta v^{Mode2}_B$ is the Brillouin frequency shift of the signal on the second branch, and $C_{v\epsilon}^{Mode1}$, $C_{v\epsilon}^{Mode2}$, $C_{vT}^{Mode1}$, and $C_{vT}^{Mode2}$ are proportionality constants related to an optical and acoustic refractive index and dopant concentration of the fiber.

12. The sensor of claim 7, wherein the fiber is a few-mode fiber.

* * * * *